(12) United States Patent
Zimmermann

(10) Patent No.: US 11,189,080 B2
(45) Date of Patent: Nov. 30, 2021

(54) METHOD FOR PRESENTING A THREE-DIMENSIONAL OBJECT AND AN ASSOCIATED COMPUTER PROGRAM PRODUCT, DIGITAL STORAGE MEDIUM AND A COMPUTER SYSTEM

(71) Applicant: Zimmermann Holding-AG, Hameln (DE)

(72) Inventor: Norbert Zimmermann, Hameln (DE)

(73) Assignee: Zimmermann Holding-Aktiengesellschaft, Hameln (DE)

( * ) Notice: Subject to any disclaimer, the term of this patent is extended or adjusted under 35 U.S.C. 154(b) by 0 days.

(21) Appl. No.: 16/764,095

(22) PCT Filed: Nov. 9, 2018

(86) PCT No.: PCT/EP2018/080752
§ 371 (c)(1),
(2) Date: May 14, 2020

(87) PCT Pub. No.: WO2019/096686
PCT Pub. Date: May 23, 2019

(65) Prior Publication Data
US 2020/0388069 A1 Dec. 10, 2020

(30) Foreign Application Priority Data

Nov. 14, 2017 (DE) .......................... 102017126748.4

(51) Int. Cl.
*G06T 15/20* (2011.01)
*G06T 15/04* (2011.01)

(52) U.S. Cl.
CPC .............. *G06T 15/20* (2013.01); *G06T 15/04* (2013.01)

(58) Field of Classification Search
None
See application file for complete search history.

(56) References Cited

U.S. PATENT DOCUMENTS

| | | | | |
|---|---|---|---|---|
| 2013/0207962 | A1* | 8/2013 | Oberdorfer | G06F 3/013 345/419 |
| 2014/0002580 | A1* | 1/2014 | Bear | G06F 3/012 348/14.07 |

(Continued)

FOREIGN PATENT DOCUMENTS

| | | |
|---|---|---|
| DE | 10356020 | 6/2005 |
| DE | 102011104216 | 12/2012 |

(Continued)

OTHER PUBLICATIONS

Cha Zhang, et al., "Viewport: A Distributed, Immersive Teleconferencing System with Infrared Dot Pattern", 3D Imaging, IEEE Mutlimedia, IEEE Service Center, New York, NY, vol. 20, No. 1, pp. 17-27, Jan. 1, 2013.

(Continued)

*Primary Examiner* — Frank S Chen
(74) *Attorney, Agent, or Firm* — Volpe Koenig

(57) ABSTRACT

A method for presenting a three-dimensional object is provided, with the three-dimensional object being presented from different viewing angles in accordance with control commands. The object is presented as having at least one display surface, that a moving image is presented on the display surface, and that the display surface including the moving image presented on the display surface is presented from different viewing angles in accordance with the control commands.

19 Claims, 2 Drawing Sheets

(56) References Cited

U.S. PATENT DOCUMENTS

| | | | | |
|---|---|---|---|---|
| 2015/0355717 | A1* | 12/2015 | Bastien | G06K 9/00355 345/156 |
| 2016/0379417 | A1* | 12/2016 | Mount | G06T 19/006 345/633 |
| 2017/0277256 | A1* | 9/2017 | Burns | G06F 3/013 |
| 2018/0081519 | A1* | 3/2018 | Kim | G02B 27/017 |
| 2019/0230409 | A1* | 7/2019 | Panda | H04N 21/4316 |

FOREIGN PATENT DOCUMENTS

| | | |
|---|---|---|
| DE | 102014013589 | 4/2016 |
| WO | 2005055146 | 6/2005 |
| WO | 2015102014 | 7/2015 |

OTHER PUBLICATIONS

Dinghuang Ji, et al., 3D Reconstruction of Dynamic Textures in Crowd Sourced Data:, European Conference on Computer Vision ECCV, pp. 143-158, https://link.springer.com/chapter/10.1007/978-3-31, 2014.

Duan Xinyu et al., Exploratory Development of Virtual Technique in Multimedia Education Domain:, E-Learing, E-Business, Enterprise Information Systems, and E-Government, EEE '09, International Conference On, IEEE, Piscataway, NJ, pp. 25-28, Dec. 5, 2009.

Marva Angelica Mora Lumbreras et al., "Enhancing the realism with 3D sound in different virtual worlds", Electornics, Communications and Computer (CONIELECOMP), 20th International Conference on, IEEE, Piscataway, NJ, pp. 187-191, Feb. 22, 2010.

Michael Chen et al., "A study in interactive 3-D rotation using 2-D control devices", Computer Graphics, ACM, U.S. vol. 22, No. 4, pp. 121-129, Jun. 1, 1998.

Genc, S. et al., Texture extraction from photographs and rendering with dynamic texture mapping, Proceedings 10th Inernational Conference on Image Analysis and Processing, IEEE Comput. Soc., Los Alamitos, CA, pp. 1055-1058, 1999.

Neumann, U et al., "Augmented virtual environments (AVE): dynamic fusion of imagery and 3d models", IEEE Virtual Reality 2003: Proceedings IEEE Virtual Reality (VR), IEEE Computer Society, Los Alamitos, CA, pp. 61-67, Mar. 22, 2003.

* cited by examiner

METHOD FOR PRESENTING A THREE-DIMENSIONAL OBJECT AND AN ASSOCIATED COMPUTER PROGRAM PRODUCT, DIGITAL STORAGE MEDIUM AND A COMPUTER SYSTEM

BACKGROUND

The virtual presentation of products is becoming increasingly widespread. Various methods for presenting a three-dimensional object are known that involve control commands being used to present the three-dimensional object from different viewing angles. This allows a user to view the object from any sides by inputs of control commands, for example.

DE 103 56 020 discloses a method and an apparatus for presenting and/or transmitting three-dimensional objects, more particularly from virtual shops and malls, specifically to mobile terminals of a communication network.

SUMMARY

The present invention is based on the object of extending the presentation options for three-dimensional objects in order to increase the attractiveness and/or information content for the viewer.

This object is achieved by a method for presenting a three-dimensional object, a computer program product, a digital storage medium, a computer system and the use of the method having one or more of the features described herein. Advantageous refinements can be found below and in the claims.

The method according to the invention is used for presenting a three-dimensional object, wherein the three-dimensional object is presented from different viewing angles on the basis of control commands. Fundamentally, the object is presented in a manner having at least one display area, a moving image is presented on the display area, and the display area with the moving image presented on the display area is presented from different viewing angles on the basis of the control commands.

The present invention extends the previously known presentations of three-dimensional objects by virtue of a moving image being incorporated on a display area. As a result of not only the three-dimensional object but also the display area with the moving image presented on the display area being presented from different viewing angles on the basis of the control commands, the viewer perceives the display area with the moving image as part of the object.

This extension allows additional information about the moving image to be presented for the user. Furthermore, the attractiveness of the object can be increased by virtue of advertising information being presented on the display area as a moving image. Furthermore, the user is provided with a more realistic presentation for objects that, as real objects, have a display area for presenting a moving image (for example screens), since a moving image is preferably presented at the location of the display area of the real three-dimensional object even in the virtual presentation of the three-dimensional object.

Preferably, the display area is presented in an invariable spatial arrangement in relation to the three-dimensional object. As a result, the user attributes the display area to the object on the basis of the constant spatial arrangement relative thereto.

Advantageously, the display area is presented as part of the surface of the three-dimensional object. As a result, the user immediately recognizes the display area as part of the presented three-dimensional object.

In one advantageous embodiment, a polygonal network is generated for presenting the three-dimensional object, in order to approximately describe the contours of the three-dimensional object. The approximate description of the contours of the three-dimensional object by a polygonal network has the advantage that a presentation with reduced data volume is possible.

More particularly, the local qualities of the object can be taken as a basis for choosing the density of the polygonal network. Furthermore, a magnification chosen by the user for the presentation can be taken as a basis for presenting a coarser polygonal network for an overall view and a finer polygonal network for a detail view, for example, so that the required volume of data to be transmitted can be reduced overall.

Methods for generating a polygonal network for approximately describing the contours of the three-dimensional object are known per se and described for example in DE 10 2014 013 589 A1, WO 2005/055146 A1 or DE 103 56 020 A1.

Advantageously, a subset containing n polygons $P_i$ ($i=1, \ldots, n$) from the polygons of the polygonal network is assigned to the display area in this instance. The moving image is divided into n moving image elements $T_i$ ($i=1, \ldots, n$), and the moving image element $T_i$ ($i=1, \ldots, n$) is presented on a polygon $P_i$ in each case.

Depending on the splitting of the display area into polygons that takes place when the polygonal network is created, identical splitting of the moving image into polygons therefore preferably takes place, so that the assigned polygonal image element of the moving image is presented on each polygon of the display area when the three-dimensional object is presented. This allows presentation and splitting methods known per se to be resorted to—as described above.

In the simplest case, the display area is a flat, rectangular area described by a single polygon ($n=1$). The invention is not limited to display areas of this kind, however. Similarly, any shaped and/or structured display areas can be presented, more particularly by preferably resorting to the above-described approximation of the shape of the display area by a polygonal network. Similarly, it is within the scope of the invention to reproduce a rectangular display area by multiple polygons of a polygonal network. The number n of polygons for describing the display area is therefore also dependent on the shape and structure (e.g. a curvature of the display area, a ripple or other unevennesses). It is within the scope of the invention for the display area to be described by a multiplicity of polygons, more particularly by a number $n>10$ and $n>100$.

Advantageously, the aforementioned polygons $P_i$ completely cover the display area, so that the moving image can be presented on the complete display area.

More particularly, it is advantageous for the polygons $P_i$ to be chosen such that a circumferential edge of marginal polygons corresponds to a circumferential edge of the display area. The division between a surface of the object outside the display area and inside the display area therefore runs along boundary lines between polygons in this advantageous embodiment. This results in the advantage that polygons always either completely belong to the display area, and hence a moving image is supposed to be presented on these polygons, or completely do not belong to the display area, and hence a moving image is not supposed to be displayed on these polygons.

Advantageously, a texture is assigned to the remaining polygons not assigned to the display area. Such a texture can be taken from a database of textures in order to reproduce a realistic presentation of the actual surface texture of the three-dimensional object.

More particularly, it is advantageous for the textures of the remaining polygons (not assigned to the display area) to be taken from photographic shots of the three-dimensional object.

In this case, methods are known that involve photographic shots of the three-dimensional object being taken from multiple viewing angles and a partial detail being extracted from the photographic shots as a texture for each polygon. More particularly, it is advantageous to calculate a normal vector for each polygon and to determine the position of the camera for that shot that has the shortest angular distance from this normal vector. The photographic shot from this shooting position is typically best suited to taking the texture for the relevant polygon. Such a method is described for example in DE 10 2011 104 216 A1, more particularly in paragraph [0025]. This specification describes the shooting by two cameras for the purpose of stereoscopic imaging. Similarly, just one camera can be used with the same method in order to assign a polygon to a texture from the camera shot as described above.

The moving image used is preferably a film. More particularly, it is advantageous to reproduce further advertising content and/or information relating to the presented three-dimensional object in this film.

In one advantageous embodiment, an audible output is additionally provided. This allows further information to be conveyed to the user not only by the moving image but also by the audible output, or the perception of the presented three-dimensional object to be further enriched by appropriate sounds and/or music. More particularly, it is advantageous for the moving image reproduced to be a film and for the audible output reproduced to be the sound of the film.

Advantageously, at least one, preferably at least two, audio output points are prescribed on the three-dimensional object. An output point is therefore preferably a loudspeaker of the real object on which the audible output is provided. In the presentation, the audible output is preferably provided on the basis of the presented viewing angle. If, together with the virtual presentation, the viewing angle is changed and, as a result, the position of the audio output point also changes, then this change of location is preferably also taken into consideration for the audible output by the real loudspeaker of a display unit on which the object is presented to the user.

The method according to the invention, more particularly a preferred embodiment thereof, is preferably used with reproduction units such as screens, more particularly computer monitors, televisions, tablet monitors or comparable screens, in order to reproduce the object on this screen.

Typical display units such as for example the aforementioned screens, more particularly monitors or televisions or computer units having a monitor or television, typically have at least two loudspeakers for stereo audio output. These two channels can therefore be used to take into consideration a spatial change in the audio output point when the viewing angle changes in a preferred embodiment: if the output point is more likely on the right-hand side, for example, then the audible output can be provided in enhanced fashion by a right loudspeaker, and vice versa if the output point is more likely on a left-hand side.

Preferably, the distance of the audio output points from the location of the viewer for the currently presented viewing angle is therefore taken into consideration for the audible output, more particularly by virtue of an audible signal from a more distant output point being reproduced at decreased volume as compared with the audible signal from an output point that is less distant from the location of the viewer. If the display unit used for presenting the three-dimensional object has multiple loudspeakers, the audible output from each output point is preferably provided at a higher volume on the loudspeaker that is closest to the output point than on loudspeakers that are more distant from the output point.

The term "distance" in this case denotes the distance of the virtual point from the real point of the loudspeaker or the location of the viewer in accordance with the three-dimensional presentation.

It is likewise within the scope of the invention for two audio output points to be prescribed on the three-dimensional object, for example. This is advantageous more particularly if the real three-dimensional object presented likewise has two loudspeakers, more particularly if the presented object is a monitor or television having two loudspeakers. In this case, a stereo output can be provided as support for the moving image. If the viewer changes the viewing angle, for example, so that the left loudspeaker of the presented object comes to be on the right-hand side in the current presentation and the right loudspeaker is accordingly on the left-hand side, then the actual output can accordingly be provided using converse channels, so that the presented spatial arrangement of the loudspeakers is taken into consideration.

Advantageously, reproduction of the moving image can be started by user input. This allows the user to choose whether he wishes to see the object per se or additional information via the moving image. More particularly, it is advantageous for reproduction of the moving image to be able to be started and/or stopped by selection of the display area by the user by a virtual pointing element. This can be accomplished by clicking on the user interface with a mouse pointer or tapping on a touch-sensitive display, for example.

The three-dimensional object is preferably presented on a two-dimensional display unit, more particularly a screen as described above, a computer monitor or a corresponding display of a tablet, smartphone or television.

The method according to the invention is suitable for presenting any three-dimensional objects. It is particularly advantageous for the three-dimensional object to comprise a display unit. This provides the user with a more realistic impression, since the actual display unit can also provide a better experience in the virtual presentation if a moving image is displayed in the virtual presentation too. More particularly, it is therefore advantageous for the three-dimensional object to be a screen or a technical device having a screen, such as for example a television, tablet and/or smartphone.

Advantageously, viewing-angle-dependent properties of the real display unit of the three-dimensional object are taken into consideration for presenting the display unit at the current viewing angle. It is known for visual displays, more particularly monitors or televisions, that the visual impression changes on the basis of the viewing angle. Typically, the best image is obtained when the user looks at the display approximately along a normal vector, which is perpendicular to the display area. When the display is viewed obliquely, image quality is frequently impaired (depending on the quality of the display) as the angle with respect to the surface normal of the display increases. In an advantageous embodiment, this change is taken into consideration by calculating the viewing angle with respect to the display unit, more particularly preferred angles with respect to a surface normal of the display unit, when a viewing angle for presenting the three-dimensional object is prescribed, and selecting and/or modifying the moving image as appropriate in order to reproduce the altered visual perception on the basis of the current viewing angle with respect to the display unit. In this advantageous embodiment, the user can therefore obtain an impression of the quality of the reproduction at different viewing angles by rotating the object in the virtual presentation, for example.

Advantageously, different viewing angles for the presentation are prescribed by virtue of a rotation of the presented object being effected on the basis of control commands. More particularly, it is known practice to use control commands to perform a spatial rotation, preferably a rotation either about one or more of three orthogonal spatial axes and/or about a fixed base point. In this instance, methods are known, and also familiar to many users, that involve for example the mouse pointer or another unit for inputting control commands being able to be used to rotate the presented object arbitrarily in space.

The control commands can be prescribed by a program, so that for example the user is presented with the three-dimensional object from all sides by prescribed rotations. Alternatively or additionally, it is advantageous for the control commands to be read in via a user interface, more particularly via one or more elements from the group comprising keyboard, mouse, touch-sensitive surface. This allows the user to set an individual viewing angle with respect to the presented object.

The object mentioned at the outset is furthermore achieved by a computer program product for performing a method as claimed in one of the preceding claims, more particularly having a program code, stored on a tangible machine-readable carrier, for performing a method as claimed in one of the preceding claims. It is likewise achieved by a digital storage medium, having electronically readable control signals that can interact with a programmable computer system such that the method according to the invention, more particularly a preferred embodiment thereof, is carried out. It is likewise achieved by a computer system having at least one computing unit, a display unit and a digital storage medium as described above.

More particularly, the object cited at the outset is achieved by a computer system having at least one computing unit, a display unit and a digital storage medium, which are designed in a manner interacting such that a program stored on the storage medium is executable by the computing unit, and the computing unit is designed to send image signals to the display unit, wherein the storage medium stores a program for performing the method steps of presenting the three-dimensional object on the display unit from different viewing angles on the basis of control commands by the computing unit, presenting the object in a manner having at least one display area, and presenting the display area with the moving image presented on the display area on the display unit from different viewing angles on the basis of the control commands by the computing unit.

Furthermore, the object cited at the outset is achieved by the use of the method according to the invention, more particularly a preferred embodiment thereof, for presenting three-dimensional objects in virtual sales portals, more particularly virtual shops or malls.

BRIEF DESCRIPTION OF THE DRAWINGS

Further preferred features and embodiments are explained below on the basis of an exemplary embodiment and the figures.

FIGS. 1 to 3 each show a depiction of a monitor as a three-dimensional object, in which:

FIG. 1 is a front view from the front,

FIG. 2 is a view after rotation about axis A shown in FIG. 1, and

FIG. 3 is a view after rotation about axis B shown in FIG. 1.

DETAILED DESCRIPTION

Figure 2:
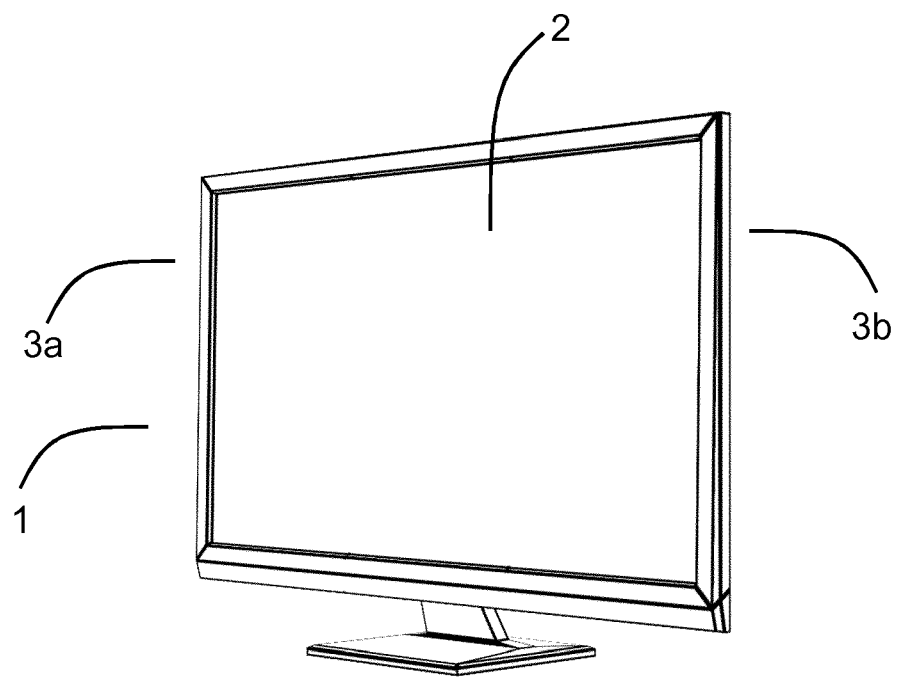
Figure 3:
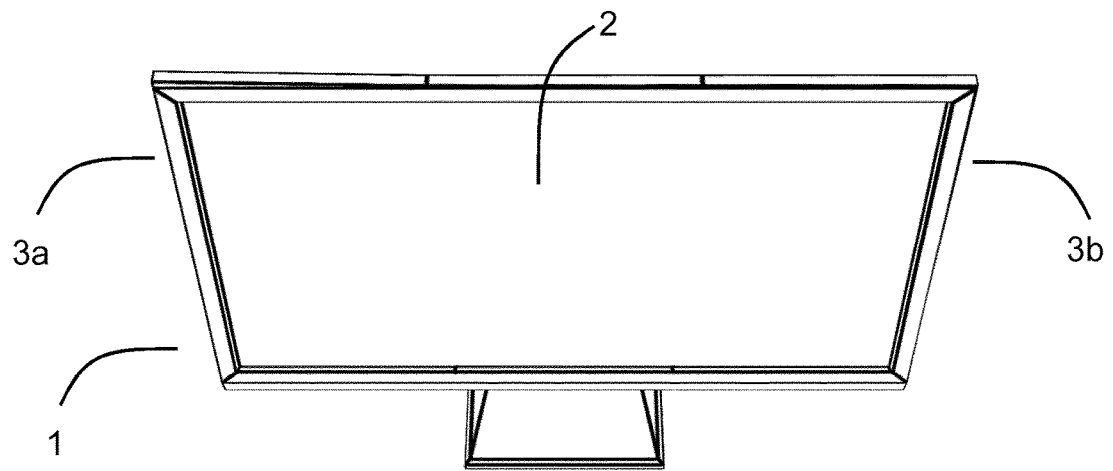

In the exemplary embodiment of the method according to the invention, a monitor 1 is therefore presented for the user two-dimensionally on a screen as a real three-dimensional object. In this instance, the user can use the arrow keys of a keyboard, for example, to selectively perform a rotation about axis A and/or B. An exemplary result for a rotation about axis A is depicted in FIG. 2 and for a rotation about axis B is depicted in FIG. 3.

The virtual presentation was produced by virtue of a real monitor having produced a polygonal network, for example by the method described in DE 10 2011 104 216. Furthermore, the monitor has a display area 2. Fundamentally, a film is presented on the display area 2 as a moving image. If the user now chooses a different viewing angle, for example the viewing angle shown in FIG. 2, then the display area with the moving image presented on the display area is likewise shown in the perspective depiction shown in FIG. 2. The same applies to the viewing angle shown in FIG. 3.

The display area 2 is therefore in an invariable spatial arrangement in relation to the three-dimensional object of the monitor 1 and is presented as part of the surface of the monitor 1.

In the present case, the display area is a flat rectangle and can therefore be described by a polygon. The border of this polygon is identical to the border of the display area, which means that it is easy to distinguish between the polygon $P_1$ that relates to the display area and the remaining polygons, which are the rest of the parts of the monitor. Accordingly, the moving image $T_1$ can easily be reproduced on the polygon $P_1$.

Audio output points 3a and 3b are defined on the right and left on the monitor 1, which correspond to the positions of loudspeakers on the real monitor. The moving image reproduced on the display area 2 of the monitor 1 is a film with a stereo sound. If the user chooses the viewing angle shown in FIG. 1, for example, then the stereo sound is output in the usual way via the left and right loudspeakers of the real display on which the user looks at the presentation. If, on the other hand, the user chooses a viewing angle as shown in FIG. 2, for example, where the loudspeaker 3a of the presented monitor 1 is averted from the user, whereas the loudspeaker 3b faces the user, then the right channel is accordingly reproduced louder than the left channel when the stereo sound is output.

The film that presents the moving image is stored for multiple viewing angles. If the user now chooses a viewing angle as shown in FIG. 2, for example, then that moving image among the stored moving images whose viewing angle comes closest to the one according to the depiction shown in FIG. 2 is selected. This moving image is then reproduced on the display area 2 accordingly. The user is thereby provided with an impression of the viewing-angle-dependent properties of the monitor.

Figure 4:
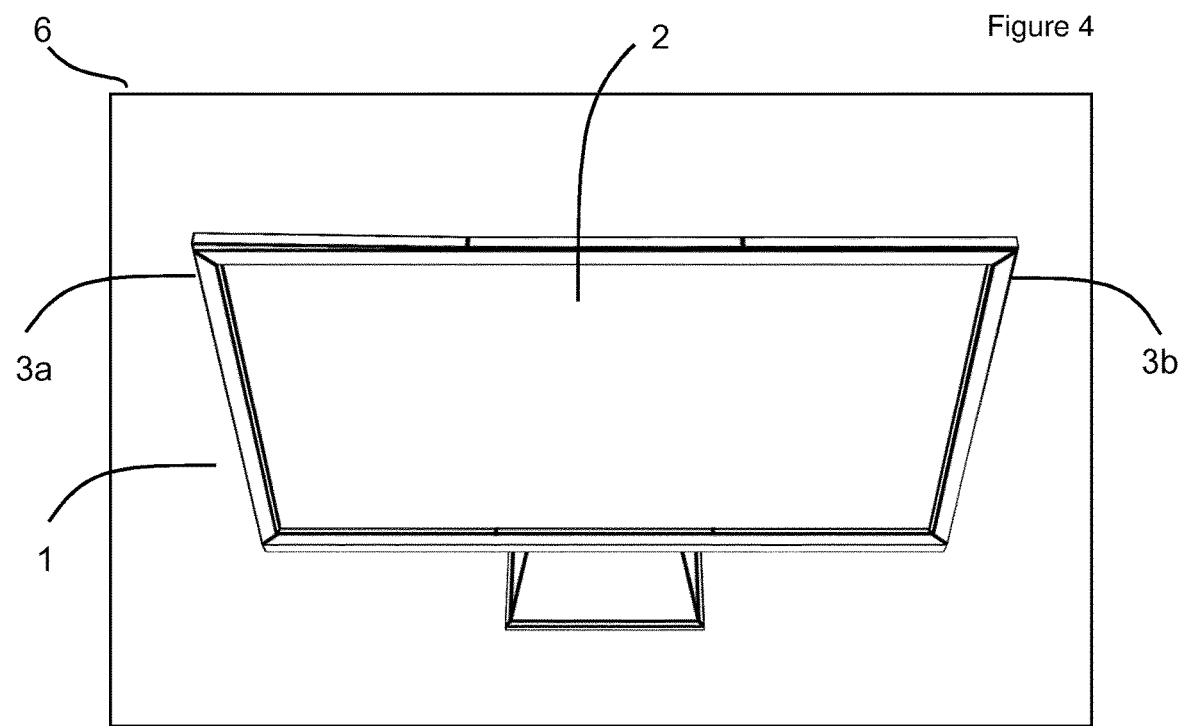
FIG. 4 shows a computer system for performing the exemplary embodiment of a method according to the invention that is described on the basis of FIGS. 1 to 3.

FIG. 4 depicts an exemplary embodiment of a computer system according to the invention. The computer system has a computing unit 4, a screen 6 and a digital storage medium 5. These fundamentally interact in a manner known per se for computer systems, so that a program stored on the storage medium 5 is executable by the computing unit 4 and the computing unit 4 is designed to send image signals to the screen 6, so that two-dimensional images can be produced on the screen 6 accordingly.

Figure 1:
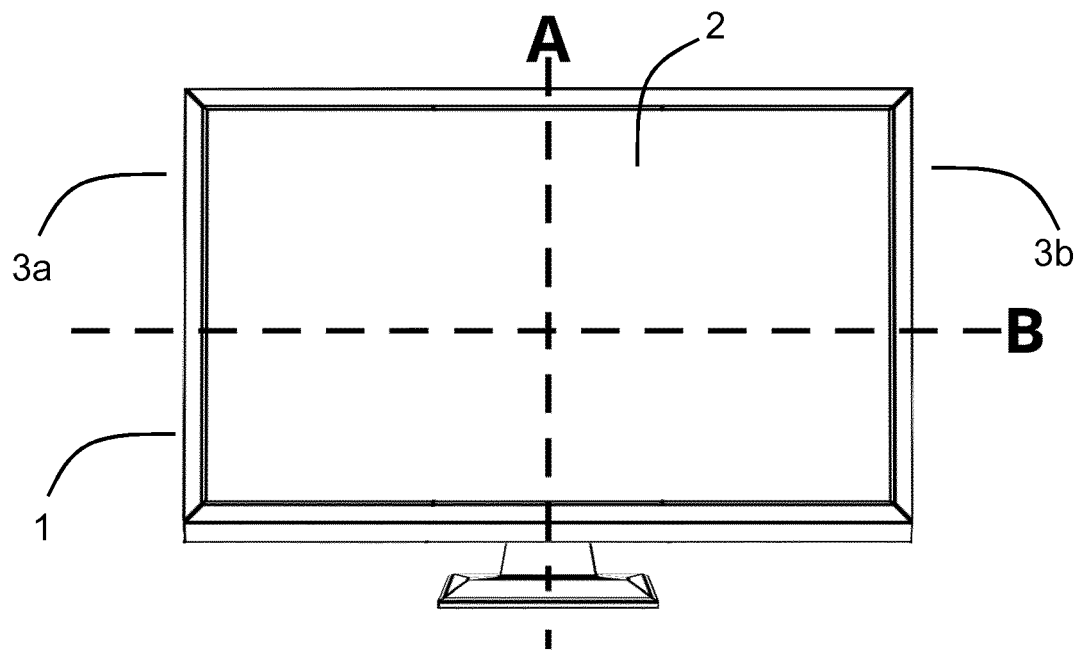

Fundamentally, the storage medium 5 stores a program, for performing a method according to the invention, more particularly a preferred embodiment thereof. In the present case, the storage medium 5 stores a program for carrying out the method described above on the basis of FIGS. 1 to 3. FIG. 4 shows the state in which the user used control commands to choose a rotation about the axis B as shown in FIG. 1 in order to arrive at a presentation as shown in FIG. 3. The program stored on the storage medium 5 is executed by the computing unit 4 and sends appropriate image signals to the screen 6 in order to attain the presentation shown in FIG. 3 on the screen 6. The computing unit 4 has a keyboard and a touch-sensitive surface (touchpad) for inputting control commands.

In the present case, the storage medium 5 is in the form of a hard disk. Similarly, the storage medium can be in the form of a main memory or another type of memory. The storage medium can be arranged in or directly on the computing unit; similarly, the storage medium can be arranged on a server connected to the computing unit 5 by an Internet connection.

The invention claimed is:

1. A method for virtually presenting an actual three-dimensional object having a real display area, the real display area having an impaired image quality as a viewing angle with respect of a surface normal of the real display area increases, wherein the actual three-dimensional object is presented from different viewing angles based on control commands, the method comprising:
presenting a virtual representation of the object with a virtual display area representing the real display area,
presenting a moving image on the virtual display area,
a user using control commands to present the virtual display area with the moving image presented on the virtual display area, and
as a virtual viewing angle changes with respect to a surface normal of the virtual display area, modifying the moving image to present an altered visual perception corresponding to the impaired image quality of the real display area based on the corresponding viewing angle to provide a visual impression of the moving image on the display area at the changed viewing angle.

2. The method as claimed in claim 1, wherein the virtual display area is presented in an invariable spatial arrangement in relation to the three-dimensional object.

3. The method as claimed in claim 1, further comprising presenting the virtual display area as part of a surface of the three-dimensional object.

4. The method as claimed in claim 1, further comprising generating a polygonal network for presenting the three-dimensional object, in order to approximately describe contours of the three-dimensional object.

5. The method as claimed in claim 4, further comprising assigning a subset containing n polygons Pi (i=1, . . . , n) from polygons of a polygonal network to the display area,
dividing the moving image into n moving image elements Ti (i=1, . . . , n), and
presenting the moving image element Ti (i=1, . . . , n) on a polygon Pi in each case,
wherein the polygons Pi completely cover the virtual display area.

6. The method as claimed in claim 5, further comprising choosing the polygons Pi such that a circumferential edge of marginal polygons corresponds to a circumferential edge of the virtual display area.

7. The method as claimed in claim 6, further comprising assigning a texture to the remaining polygons not assigned to the virtual display area.

8. The method as claimed in claim 7, further comprising taking the textures of the remaining polygons from photographic shots of the three-dimensional object.

9. The method as claimed in claim 1, further comprising providing an audible output.

10. The method as claimed in claim 9, wherein at least two audio output points are prescribed on the three-dimensional object, and the method further comprises providing the audible output based on a presented viewing angle.

11. The method as claimed in claim 1, further comprising at least one of starting or stopping reproduction of the moving image by a user input by selecting the virtual display area using a virtual pointing element.

12. The method as claimed in claim 1, further comprising presenting the three-dimensional object on a two-dimensional display unit.

13. The method as claimed in claim 1, wherein the three-dimensional object comprises a display unit.

14. The method as claimed in claim 1, further comprising effecting a rotation of the presented object based on control commands.

15. The method as claimed in claim 14, further comprising reading in the control commands via a user interface comprising one or more elements from the group comprising a keyboard, a computer mouse, or a touch-sensitive surface.

16. A non-transitory computer-readable storage medium comprising electronically readable control signals fixed in the non-transitory computer-readable storage medium configured to interact with a programmable computer system to carry out the method as claimed in claim 1.

17. The method as claimed in claim 1, wherein the method is for presenting three-dimensional objects in virtual sales portals.

18. A computer program product for virtually presenting an actual three-dimensional object having a real display area, the real display area having an impaired image quality as a viewing angle with respect of a surface normal of the real display area increases, the computer program product comprising a program code, stored on a non-transitory computer-readable storage medium, adapted to configure a display for performing a method having the method steps of:
presenting a virtual representation of the three-dimensional object from different viewing angles based on control commands,
presenting the object with a virtual display area representing the real display area,
using the control commands for presenting the virtual display area with a moving image presented on the virtual display area from different viewing angles, and
as a virtual viewing angle changes with respect to a surface normal of the display area, modifying the moving image to present an altered visual perception corresponding to the impaired image quality of the real display area based on the corresponding viewing angle to provide a visual impression of the moving image on the display area at the changed viewing angle.

19. A computer system comprising: at least one computing unit, a screen, and a digital storage medium, which are configured to interact with a program stored on the storage medium that is executable by the computing unit, and the computing unit is configured to send image signals to the screen, wherein the storage medium stores a program for performing the method steps of presenting a virtual representation of an actual three-dimensional object which has a real display area, the real display area having an impaired image quality as a viewing angle with respect of a surface normal of the real display area increases, on the screen from different viewing angles based on control commands by the computing unit, presenting the virtual object in a manner with a virtual display area representing the real display area, presenting the virtual display area with a moving image presented on the virtual display area on the screen from different viewing angles based on the control commands by the computing unit, and as a viewing angle changes with respect to a surface normal of the virtual display area, modifying the moving image to present an altered visual perception corresponding to the impaired image quality of the real display area based on the corresponding viewing angle to provide a visual impression of the moving image on the display area at the changed viewing angle.

* * * * *